United States Patent
Kadri et al.

(10) Patent No.: US 12,489,483 B2
(45) Date of Patent: Dec. 2, 2025

(54) WIRELESS COMMUNICATIONS ASSEMBLIES FOR MITIGATING RADIO FREQUENCY DESENSITIZATION

(71) Applicant: ZEBRA TECHNOLOGIES CORPORATION, Lincolnshire, IL (US)

(72) Inventors: Irfan Kadri, Mississauga (CA); Mushfiqul Hasan, Mississauga (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 477 days.

(21) Appl. No.: 18/110,589

(22) Filed: Feb. 16, 2023

(65) Prior Publication Data

US 2024/0056114 A1    Feb. 15, 2024

Related U.S. Application Data

(60) Provisional application No. 63/396,717, filed on Aug. 10, 2022.

(51) Int. Cl.
    *H04B 1/38*     (2015.01)
    *H01Q 1/52*     (2006.01)
    *H05K 9/00*     (2006.01)

(52) U.S. Cl.
    CPC .............. *H04B 1/38* (2013.01); *H01Q 1/526* (2013.01); *H05K 9/0007* (2013.01)

(58) Field of Classification Search
    CPC . H04B 1/38; H01Q 1/526; H05K 9/00; H05K 9/007
    See application file for complete search history.

(56) References Cited

U.S. PATENT DOCUMENTS

| | | | |
|---|---|---|---|
| 8,564,452 B2 * | 10/2013 | Schaible ............... | G08B 21/18 340/572.1 |
| 8,933,847 B2 * | 1/2015 | Yang ..................... | H01Q 1/243 343/702 |
| 8,981,955 B2 * | 3/2015 | Schaible ................. | F16P 3/14 340/685 |
| 9,300,343 B2 * | 3/2016 | Luckman ................ | H04M 1/04 |
| 9,812,774 B2 * | 11/2017 | Jang ........................ | H01Q 7/04 |
| 10,509,213 B1 * | 12/2019 | Monari ................ | G02B 15/163 |
| 11,316,284 B2 * | 4/2022 | Cho ..................... | H01Q 1/2283 |
| 11,374,646 B2 * | 6/2022 | Anderson ............. | H04W 92/20 |
| 11,515,621 B2 * | 11/2022 | Ramasamy ............ | H01Q 1/243 |
| 12,060,018 B2 * | 8/2024 | Romero ................ | H04L 12/40 |
| 12,294,139 B2 * | 5/2025 | Park ..................... | H01Q 1/2266 |
| 12,363,215 B2 * | 7/2025 | Kim ..................... | H04M 1/0249 |

(Continued)

*Primary Examiner* — Hai V Nguyen (57) ABSTRACT

A computing device includes: a housing having a plurality of outer walls; a first wireless communications assembly supported within the housing and including a first antenna; a wired communications assembly supported within the housing and including a port on one of the outer walls, the port configured to connect with another device; and a second wireless communications assembly supported within the housing and including a second antenna affixed to an electromagnetic shield disposed adjacent to the port of the wired communications assembly, the electromagnetic shield configured to shield the first antenna from electromagnetic noise generated by the wired communications assembly.

20 Claims, 6 Drawing Sheets

(56) References Cited

U.S. PATENT DOCUMENTS

| | | | | |
|---|---|---|---|---|
| 2011/0227748 | A1* | 9/2011 | Schaible | F16P 3/147 340/686.6 |
| 2012/0219263 | A1* | 8/2012 | Beamon | G02B 6/4246 29/834 |
| 2014/0043168 | A1* | 2/2014 | Schaible | F16P 3/147 340/686.6 |
| 2015/0141075 | A1* | 5/2015 | Luckman | H04M 1/04 455/557 |
| 2016/0064814 | A1* | 3/2016 | Jang | H05K 9/0075 174/377 |
| 2017/0077593 | A1* | 3/2017 | Cheng | H01Q 1/243 |
| 2018/0286817 | A1* | 10/2018 | Kitazaki | H01L 21/78 |
| 2018/0313877 | A1* | 11/2018 | Brant | G01R 23/02 |
| 2018/0316082 | A1* | 11/2018 | Keller, III | H01Q 1/38 |
| 2020/0169315 | A1* | 5/2020 | Anderson | H04W 92/20 |
| 2020/0373682 | A1* | 11/2020 | Root | H01Q 1/1228 |
| 2021/0135378 | A1* | 5/2021 | Cho | H01Q 1/2283 |
| 2021/0175610 | A1* | 6/2021 | Ramasamy | H01Q 1/2266 |
| 2022/0311851 | A1* | 9/2022 | Kim | H01Q 1/38 |
| 2022/0357766 | A1* | 11/2022 | Karkera | G02B 27/017 |
| 2022/0396224 | A1* | 12/2022 | Romero | B60R 16/03 |
| 2023/0021614 | A1* | 1/2023 | Park | H01Q 1/2266 |
| 2023/0080461 | A1* | 3/2023 | Latif | H04B 17/29 455/296 |
| 2023/0179020 | A1* | 6/2023 | Kim | H04B 5/24 320/108 |
| 2023/0371785 | A1* | 11/2023 | Fujii | A61B 1/042 |
| 2024/0048972 | A1* | 2/2024 | Karkera | H04W 12/033 |
| 2024/0114662 | A1* | 4/2024 | Kim | C08K 7/02 |
| 2024/0340387 | A1* | 10/2024 | Kim | H04N 5/645 |

\* cited by examiner

WIRELESS COMMUNICATIONS ASSEMBLIES FOR MITIGATING RADIO FREQUENCY DESENSITIZATION

CROSS-REFERENCE TO RELATED APPLICATIONS

This application claims priority from U.S. Provisional Application No. 63/396,717, filed Aug. 10, 2022, the content of which incorporated herein by reference.

BACKGROUND

Mobile computing devices may include various distinct communications assemblies to implement a plurality of wired and/or wireless communications standards. Certain communications assemblies may have overlapping operating frequencies, and physical space within such computing devices may be limited, such that different communications assemblies are deployed in close proximity to one another. The performance of some communications assemblies may therefore be adversely affected by other communications assemblies.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a computing device including: a housing having a plurality of outer walls; a first wireless communications assembly supported within the housing and including a first antenna; a wired communications assembly supported within the housing and including a port on one of the outer walls, the port configured to connect with another device; and a second wireless communications assembly supported within the housing and including a second antenna affixed to an electromagnetic shield disposed adjacent to the port of the wired communications assembly, the electromagnetic shield configured to shield the first antenna from electromagnetic noise generated by the wired communications assembly.

Additional examples disclosed herein are directed to a computing device, comprising: a first wireless communications assembly including a first antenna; a wired communications assembly including a port configured to connect the computing device with another device; and a second wireless communications assembly including: an electromagnetic shield disposed adjacent to the port, and a second antenna affixed to the electromagnetic shield.

Figure 1:
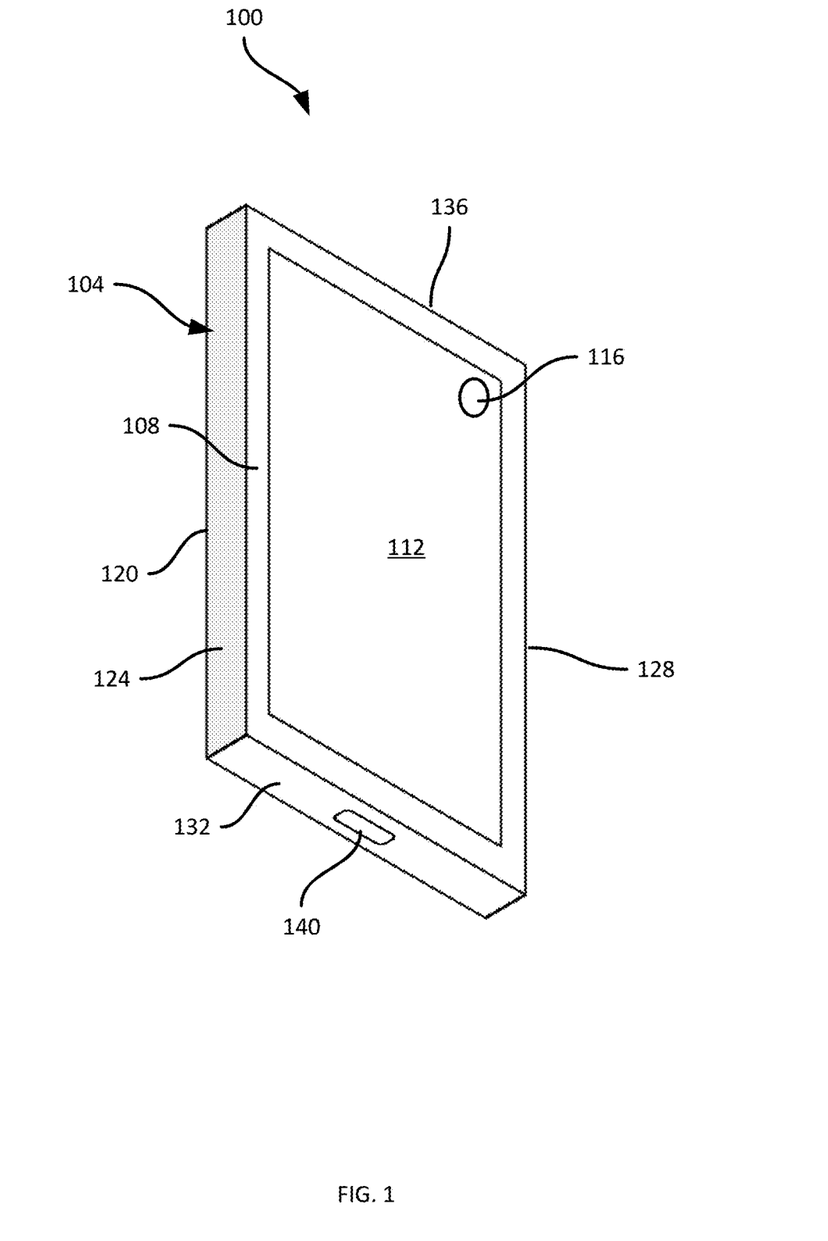
FIG. 1 is a diagram of a computing device.

FIG. 1 illustrates a mobile computing device 100, such as a smart phone, tablet computer, or the like. The device 100 includes a housing 104 supporting various other components of the device 100. In the illustrated example, the housing 104 includes a plurality of outer walls, such as a front wall 108 supporting a display 112 and a camera 116, and an opposing rear wall 120, which is substantially parallel to the front wall 108 and the display 112. The outer walls of the housing 104 can also include opposing side walls 124 and 128, as well as a bottom wall 132 and an opposing top wall 136. In other examples, the housing 104 can have any of a wide variety of other form factors, including other combinations of outer walls. The outer walls of the housing 104, in general, form a substantially enclosed compartment containing or otherwise supporting various other components of the device 100.

The device 100 can include, in addition to the display 112 and the camera 116, other input and output devices such as speakers, microphones, buttons, touch screens (e.g., a touch screen integrated with the display 112). In addition, the device 100 can include various internal components, such as processing and storage hardware (e.g., a central processing unit or CPU, one or more memory circuits, and the like). To enable communication between the device 100 and other computing devices, the device 100 can further include a plurality of communications assemblies. The communications assemblies can include, for example, a wired communications assembly implementing the universal serial bus (USB) standard, and including a port 140 on an outer wall of the housing 104 (e.g., the bottom wall 132, in the illustrated example).

Figure 2:
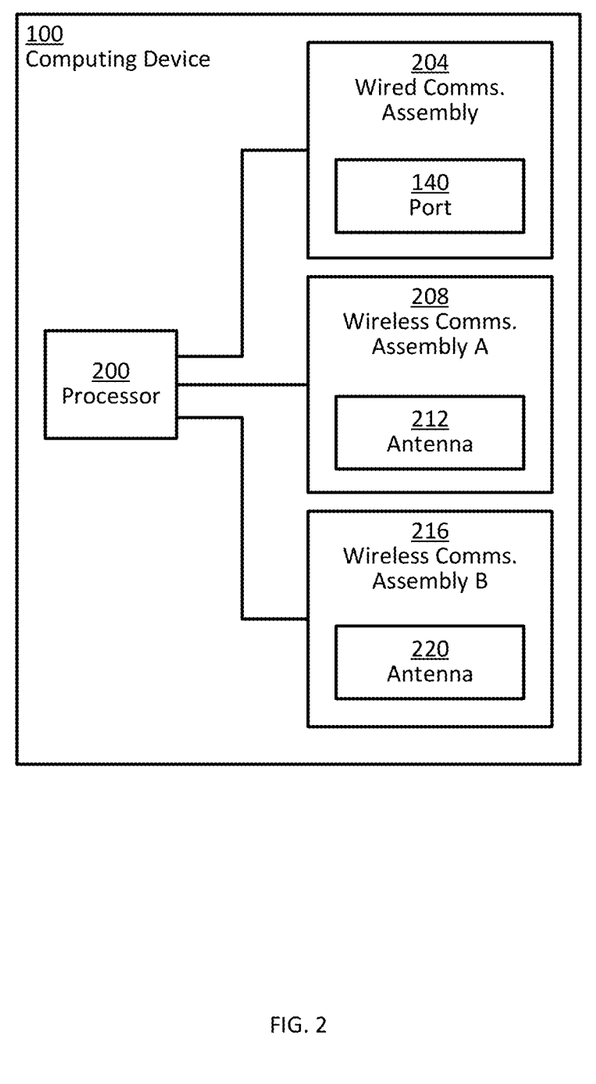
FIG. 2 is a diagram illustrating certain communications-related components of the computing device of FIG. 1.

The communications assemblies of the device 100 also include a plurality of wireless communications assemblies, e.g., implementing distinct wireless communications standards such as the Institute of Electrical and Electronics Engineers (IEEE) 802.11 family of standards, cellular standards (e.g. 4G long-term evolution (LTE), 5G and the like). Referring to FIG. 2, certain internal components of the device 100 are shown, including a processor 200 (e.g., a CPU and/or graphics processing unit (GPU) and associated memory circuits, e.g., implemented in a system-on-chip (SoC)) and a plurality of communications assemblies. As shown in FIG. 2, the communications interfaces include a wired communications assembly 204 including the port 140. As will be apparent, the port 140 enables physical engagement with another device (e.g., via a cable with suitable connectors), and is connected by one or more electrical conduits (e.g., flex cables or the like) with other components of the assembly 204 contained within the housing 104. Such other components can include sets of header pins, control chips, and the like, which are in turn connected to the processor 200.

The communications interfaces of the device 100 also include, in the illustrated example, a first wireless communications assembly 208 having a first antenna 212. The assembly 208 can implement, for example, one or more Wi-Fi communications standards. The communications interfaces also include a second wireless communications assembly 216 having a second antenna 220. The assembly 216 can implement, for example, one or more NFC communications standards. Each of the assemblies 208 and 216 include radio transceivers, baseband controllers, and the like, in addition to the respective antennas 212 and 220.

As will be apparent, when the wired communications assembly 204 is active (e.g., when another computing device is connected with the device 100 via the port 140), the port 140 and/or the conduit(s) connecting the port 140 to other components of the assembly 204 may generate electromagnetic radiation. Further, when the assembly 204 implements certain wired communications standards (e.g., variants of the third major version of the USB standard) the port 140 and associated conduits may generate electromagnetic radiation (that is, radio frequency noise) with frequencies that overlap with the operating frequency range of the assembly 208. For example, the RF noise generated by the assembly 204 can have frequencies between about 400 MHz and about 3 GHz.

The RF noise generated by the assembly 204 during operation can therefore interfere with reception of signals at the assembly 208. For example, the assembly 208 may suffer from RF desensitization during operation of the assembly 204 (e.g., a reduced sensitivity to received signals, caused by the increased level of RF noise resulting from operation of the assembly 204). RF desensitization can lead to reduced performance and/or loss of connectivity at the assembly 208.

Approaches to mitigating interference from the assembly 204 at the assembly 208 can include, for example, physically arranging the components of the device 100 to increase a distance between antenna 212 and the port 140 and/or other components of the assembly 204. However, mobile computing devices such as the device 100 may have relatively small physical form factors, such that the extent to which the antenna 212 and the assembly 204 can be physically separated is limited. Further, the device 100 may include a number of additional wireless communications assemblies, such that a greater number of antennas are supported within the housing 104, further complicating efforts to physically separate such antennas from the wired communications assembly 204.

Other approaches to mitigating the above-mentioned interference include applying shielding coatings to the port 140 and/or conduits of the assembly 204. Such approaches can increase the cost and complexity of manufacturing the device 100, however, and may also have limited mitigating effect on electromagnetic noise, e.g., due to the relatively small amount of shielding material present.

Figure 3:
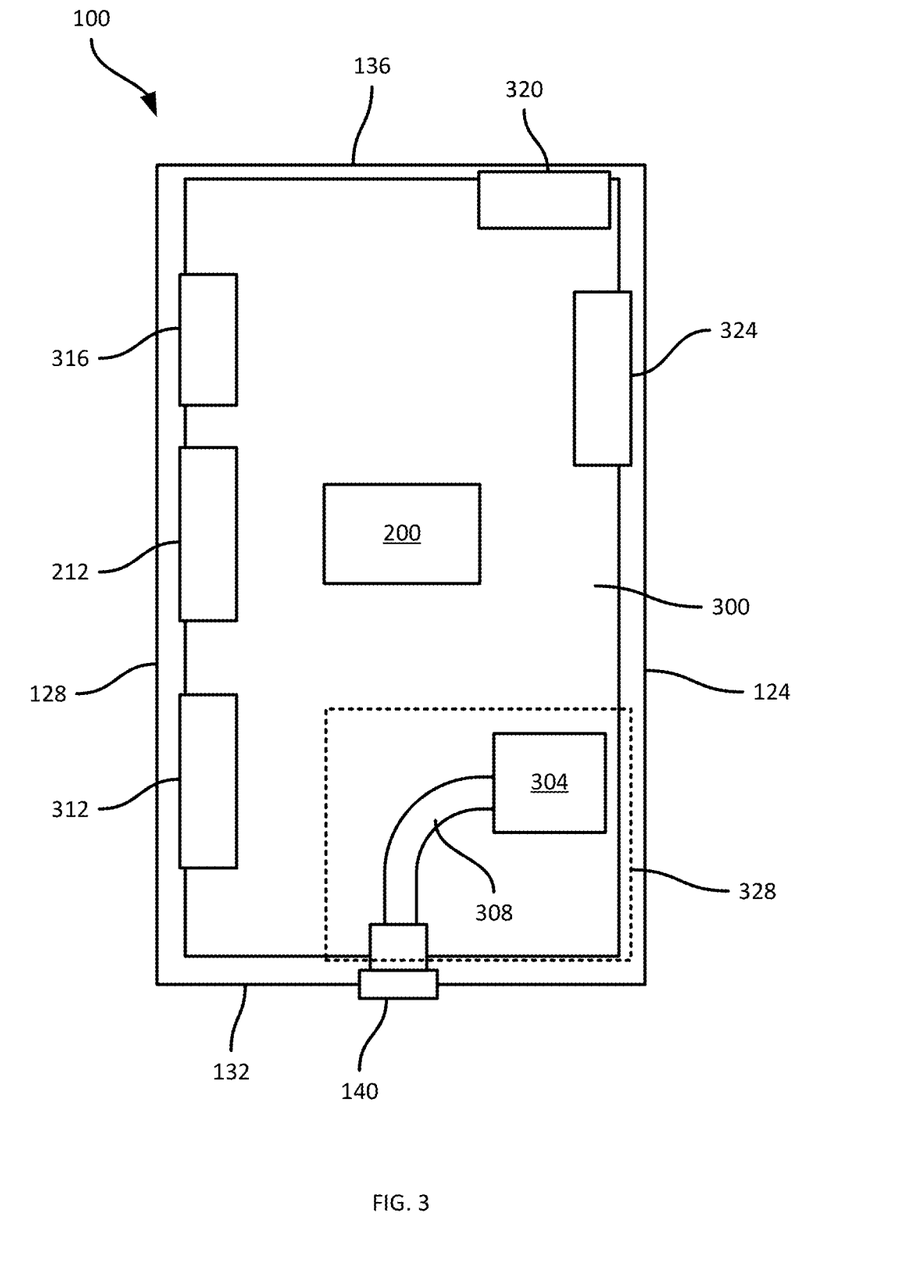
FIG. 3 is a diagram illustrating certain components in a housing interior of the computing device of FIG. 1.

Turning to FIG. 3, an example internal view of the device 100 is shown from the back, with the back wall 120 removed to reveal an interior of the housing 104. The housing 104 contains, for example, a circuit board 300 or other support member (or, in some examples, a plurality of such support members) carrying various other components of the device 100, including the processor 200. The board 300 can contain traces or other conductive elements (not shown) interconnecting various electrical components of the device 100. The port 140 is shown extending from an interior of the housing 104 to an exterior of the housing via the bottom wall 132, and the wired communications assembly 204 can also include an integrated circuit such as a USB controller 304, and/or a USB header or the like, which are in turn connected with the processor 200 via the above-mentioned conductive elements of the board 300. The assembly 204 further includes an electrical conduit 308, such as a flex cable, extending between the port 140 and the controller 304. As will be apparent, both the port 140 and the conduit 308 can generate electromagnetic noise during operation, which can interfere with the operation of the wireless communications assembly 208 and any other wireless communications assemblies of the device 100.

Also shown in FIG. 3 are the antenna 212 of the assembly 208, and a plurality of additional antennas, e.g., of additional wireless communications assemblies. In particular, FIG. 3 illustrates antennas 312, 316, 320, and 324, arranged at the periphery of the board 300 and electrically coupled to respective transceivers and/or other components. The antennas 212, 312, 316, 320, and 324 may implement a wide variety of communications standards, including Wi-Fi 33, various cellular standards, global positioning system (GPS) reception, short-range standards such as Bluetooth™, and the like. The physical size of the device 100 (e.g., selected for a handheld form factor) may be sufficiently small that all of the antennas 212, 312, 316, 320, and 324 are susceptible to interference from electromagnetic noise generated by the port 140 and conduit 308 when the assembly 204 is active.

The device 100 includes additional structural features to mitigate interference from the wired communications assembly 204 at the antenna 212 and/or the other antennas shown in FIG. 3, while also minimizing the need for additional material or manufacturing complexity in the device 100. The wireless communications assembly 216, in particular, is employed both for near-field communications, and for mitigation of interference.

The antenna 220 of the wireless communications assembly 216 is not shown in FIG. 3. As discussed below, the antenna 220 is disposed over the wired communications assembly 204, in a region 328 of the interior of the housing 104. Certain properties of the wireless communications assembly 216 and the antenna 220 render the antenna 220 suitable for use both as an NFC antenna and an electromagnetic shield to mitigate interference at the antennas 212, 312, 316, 320, and 324 emitted by the port 140 and/or the conduit 308.

The operating frequency of the antenna 220 may be lower than the frequencies at which the port 140 and the conduit 308 generate electromagnetic noise during operation. For example, the antenna 220 may operate at a frequency of about 13.56 MHz in some examples. The antenna 220 itself is therefore less susceptible to RF desensitization resulting from noise generated at the port 140 and the conduit 308 than the other antennas shown in FIG. 3.

Further, the short-range operation of the antenna 220, e.g., to communicate wirelessly with other devices over distances of a few centimeters, often places the antenna 220 in close proximity to metallic elements such as the metal housings of such other devices. Further, the back wall 120 itself may be metallic in some examples. To improve the performance of the antenna 220 while operating in proximity to such metallic masses, the wireless communications assembly 216 may include a sheet or other member of magnetically permeable material such as iron, ferrite (e.g., a ceramic containing ferrimagnetic materials such as iron and/or certain other metals), or the like. The magnetically permeable member carries the antenna 220 on a surface thereof. By arranging the antenna 220 adjacent to the wired communications assembly 204, e.g., to overlay the port 140 and the conduit 308 with the magnetically permeable member, the magnetically permeable member can be used not only to support the antenna 220, but also to shield the antennas 212, 312, 316, 320, and 324 from electromagnetic noise generated by the port 140 and/or the conduit 308.

Figure 4:
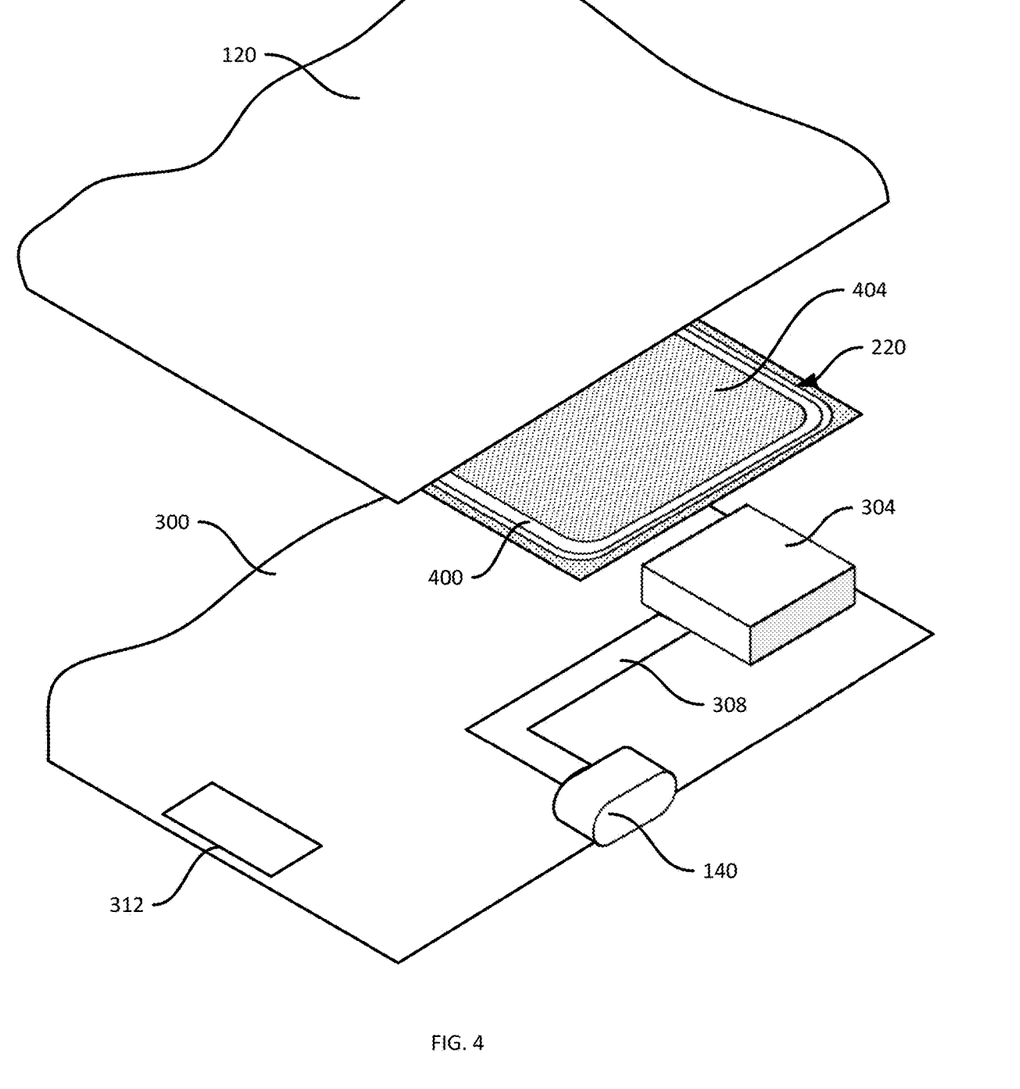
FIG. 4 is an exploded view of a portion of an interior of the computing device of FIG. 3, illustrating an electromagnetic shield.

Turning to FIG. 4, a portion of the device 100 is shown in an exploded view. In particular, a portion of the board 300 carrying the port 140, the conduit 308 and the controller 304 is shown, as well as an overlying portion of the back wall 120 of the housing 104, and the antenna 312. The antenna 220 is also illustrated as at least one loop 400 of conductive material, supported on an electromagnetic shield 404, such as a sheet of magnetically permeable material (e.g., including ferrimagnetic materials such as ferrite and the like). The material of the shield 404 can, for example, have a relative magnetic permeability of at least 100, and in some examples can have a relative magnetic permeability of at least 1000. The shield 404 carries the antenna 220. For example, in the illustrated implementation the loop(s) 400 are affixed to an outer surface of the shield 404 (e.g., a surface facing the back wall 120). In other examples, the loop(s) 400 may instead be affixed to an opposing inner surface of the shield 404 (e.g., a surface facing the board 300).

The shield 404 and the antenna 220 are disposed adjacent to the port 140 and the conduit 308, such that electromagnetic radiation emitted by the port 140 and/or the conduit 308 impacts the shield 404 prior to impacting the antennas 212, 312, 316, 320, and 324. The magnetic permeability of the shield 404 attenuates the magnetic field strength "H" of electromagnetic noise emitted by the port 140 and/or the conduit 308, this reducing the impact of such noise at the antennas 212, 312, 316, 320, and 324.

In some examples, as shown in FIG. 4, the antenna 220 extends around a perimeter of the shield 404. In other examples, the antenna 220 need not follow the perimeter of the shield 404, but rather can depart from the perimeter of the shield 404 and/or extend into a center of the shield 404, according to performance targets for the antenna 220.

The shield 404, in the present example, is substantially planar, as well as parallel to the back wall 120 and to the board 300. The shield 404 is disposed to place at least a portion of the port 140 and the conduit 308 between the board 300 and the back wall 120. That is, the shortest distance between the port 140 and the back wall 120, and/or the shortest distance between the conduit 308 and the back wall 120, traverses the shield 404.

Figure 5:
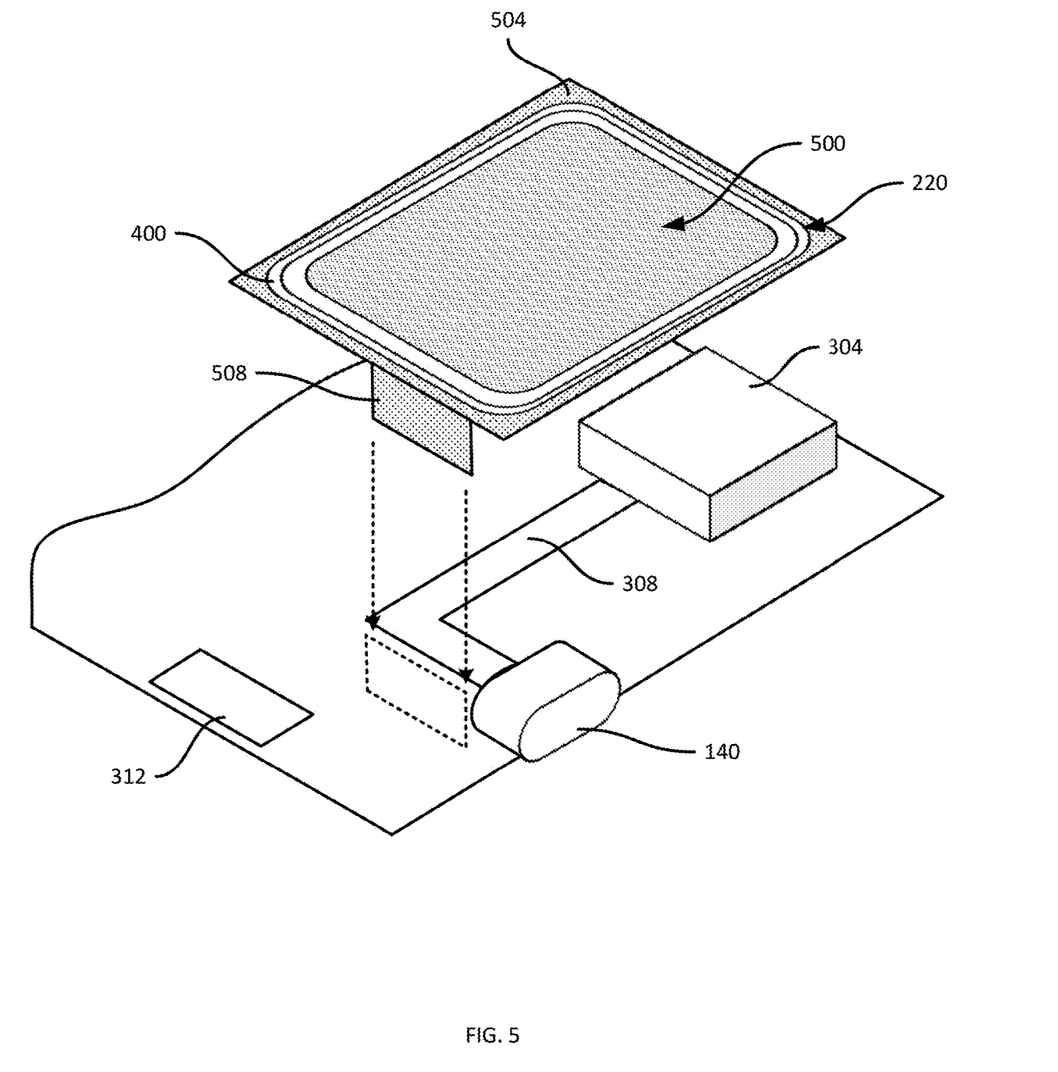
FIG. 5 is an exploded view of a portion of an interior of the computing device of FIG. 3, illustrating another electromagnetic shield.

In other examples, the shield 404 need not be restricted to a single plane. For example, turning to FIG. 5, a shield 500 is shown including a first planar portion 504 that is substantially parallel to the board 300, and a second planar portion 508 extending from the first planar portion 504. The second portion 508 is, in this example, substantially perpendicular to the first portion 504, and extends towards the board 300, e.g., to enclose at least a portion of the port 140 between the portions 504 and 508, and the board 300. More generally, the shape and orientation of various portions of the shield 500 can be selected to place the shield 500 between the wired communications assembly 204 and the various antennas of the device 100. The portions 504 and 508, in other words, need not be rectangular as shown in FIG. 5, but can take any of a wide variety of other shapes. Further, the portions 504 and 508 need not be entirely planar, but can be curved in some examples, e.g., depending on the shape of the back wall 120, the locations and shapes of other components of the device 100, and the like.

Figure 6:
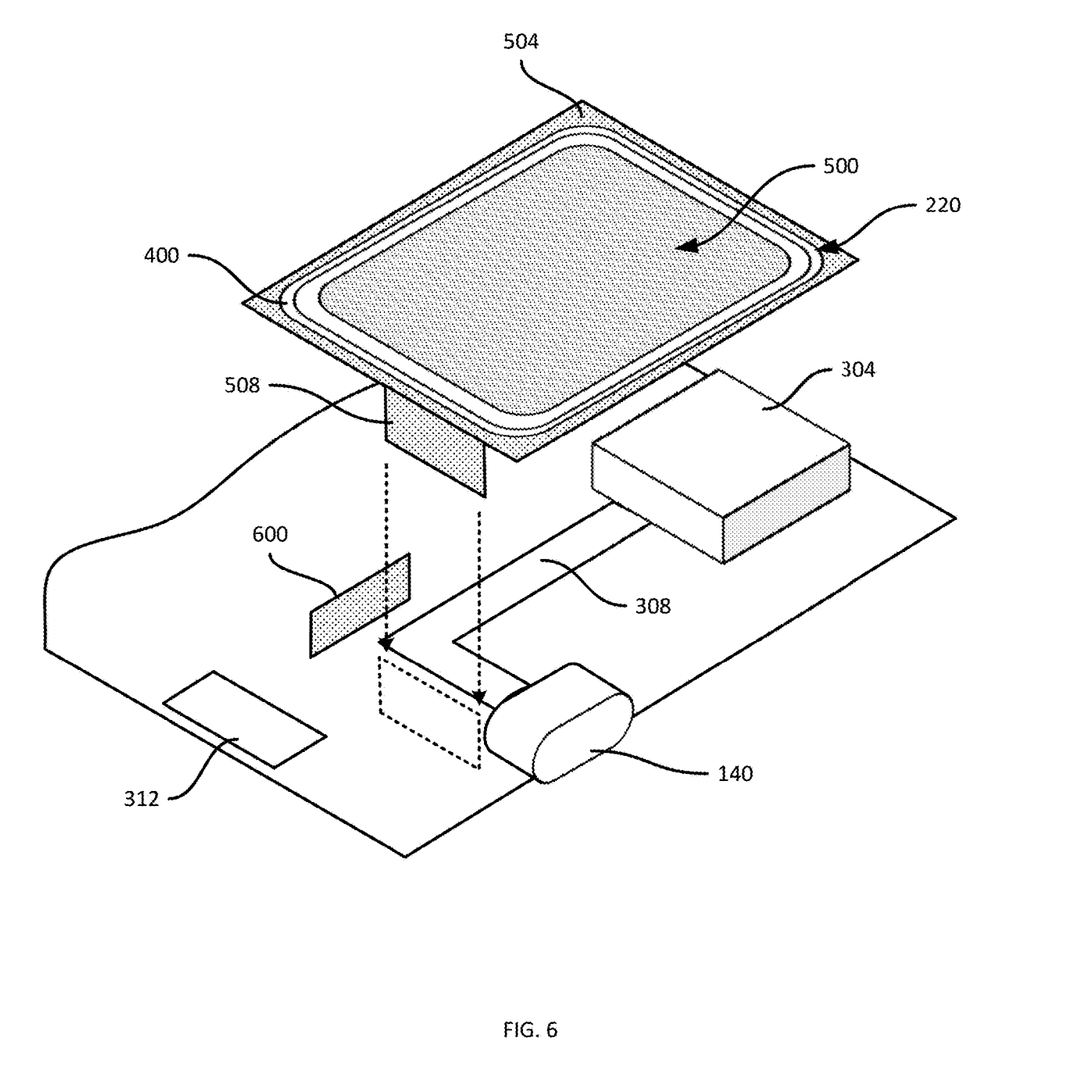
FIG. 6 is an exploded view of a portion of an interior of the computing device of FIG. 3, illustrating an auxiliary electromagnetic shield deployed with the electromagnetic shield of FIG. 5.

In other examples, as illustrated in FIG. 6, the device 100 can include additional electromagnetic shield elements, such as an auxiliary shield 600 disposed adjacent to either or both of the controller 304 and the conduit 308. The auxiliary shield 600 is physically separate from the shield 500 (e.g., fabricated and assembled separately from the shield 500). The auxiliary shield 600 can have a different orientation than the first portion 504 of the shield 500, and in this example is perpendicular to the first portion 504. In other examples, the auxiliary shield 600 can have a different orientation from both the first portion 504 and the second portion 508 of the shield 500. The auxiliary shield 600 can also have a wide variety of shapes. In further examples, more than one auxiliary shields can be provided.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computing device, comprising:
a housing having a plurality of outer walls;
a first wireless communications assembly supported within the housing and including a first antenna;
a wired communications assembly supported within the housing and including a port on one of the outer walls, the port configured to connect with another device; and
a second wireless communications assembly supported within the housing and including a second antenna affixed to an electromagnetic shield disposed adjacent to the port of the wired communications assembly, the electromagnetic shield configured to shield the first antenna from electromagnetic noise generated by the wired communications assembly.

2. The mobile computing device of claim 1, wherein the electromagnetic shield includes a sheet of magnetically permeable material carrying the second antenna.

3. The mobile computing device of claim 2, wherein the magnetically permeable material has a relative magnetic permeability of at least 100.

4. The mobile computing device of claim 2, wherein the second antenna includes at least one conductive loop disposed on a first surface of the sheet.

5. The mobile computing device of claim 2, wherein the second antenna extends around a perimeter of a first surface of the sheet.

6. The mobile computing device of claim 2, wherein the outer walls include a back wall, and wherein the magnetically permeable sheet is substantially parallel to the back wall.

7. The mobile computing device of claim 6, wherein the sheet includes a first surface facing the back wall, and a second surface opposite the first surface; and
wherein the second antenna is disposed on the second surface.

8. The mobile computing device of claim 1, further comprising:
an electrical conduit within the housing, the electrical conduit configured to connect the port to a controller;
wherein the electromagnetic shield is disposed adjacent to the port and the electrical conduit.

9. The mobile computing device of claim 1, further comprising:
a circuit board carrying the wired communications assembly;
wherein the electromagnetic shield is disposed to place the port between the electromagnetic shield and the circuit board.

10. The mobile computing device of claim 9, wherein the electromagnetic shield includes:
a first portion at a first orientation relative to the circuit board; and
a second portion at a second orientation relative to the circuit board.

11. The mobile computing device of claim 10, wherein the first portion is substantially planar, and substantially parallel to the circuit board.

12. The mobile computing device of claim 10, wherein the second portion is substantially planar, and substantially perpendicular to the first portion.

13. The mobile computing device of claim 1, further comprising an auxiliary electromagnetic shield disposed adjacent to the port of the wired communications assembly.

14. The mobile computing device of claim 1, further comprising:
a third wireless communications assembly supported within the housing and including a third antenna;
wherein the electromagnetic shield is further configured to shield the third antenna from electromagnetic noise generated by the wired communications assembly.

15. The mobile computing device of claim 1, wherein the second wireless communications assembly includes a near-field communication (NFC) transceiver, and wherein the wired communications assembly includes a universal serial bus (USB) transceiver.

16. A computing device, comprising:
a first wireless communications assembly including a first antenna;
a wired communications assembly including a port configured to connect the computing device with another device; and a second wireless communications assembly including:
an electromagnetic shield disposed adjacent to the port, and
a second antenna affixed to the electromagnetic shield.

17. The computing device of claim 16, wherein an operating frequency range of the first antenna overlaps with a frequency range of electromagnetic noise generated by the port.

18. The computing device of claim 16, wherein an operating frequency range of the second antenna does not overlap with a frequency range of electromagnetic noise generated by the port.

19. The computing device of claim 16, wherein the electromagnetic shield includes a magnetically permeable sheet.

20. The computing device of claim 16, wherein the electromagnetic shield is disposed between the port and the first antenna.

* * * * *